United States Patent [19]
Taninaka et al.

[11] 3,856,814
[45] Dec. 24, 1974

[54] OLAN-2-YLIDENEMALONATES

[75] Inventors: Kuniaki Taninaka, Ibargi; Osamu Shioyama, Osaka; Kikuzo Murata, Kawachinagano, all of Japan

[73] Assignee: Nihon Nohyaku Co., Ltd., Tokyo, Japan

[22] Filed: Feb. 27, 1973

[21] Appl. No.: 336,344

Related U.S. Application Data

[62] Division of Ser. No. 112,054, Feb. 2, 1971, Pat. No. 3,761,596.

[52] U.S. Cl. ........ 260/327 M, 260/485 R, 424/277, 424/313
[51] Int. Cl. ............................................. C07d 71/00
[58] Field of Search ................................ 260/327 M

[56] References Cited
UNITED STATES PATENTS
2,493,071   1/1950   Kendall et al...................... 260/327

OTHER PUBLICATIONS

Jensen et al., Acta Chem. Scand., 1968, 22(4), 1107–1128.

Primary Examiner—Henry R. Jiles
Assistant Examiner—C. M. S. Jaisle
Attorney, Agent, or Firm—Karl W. Flocks

[57] ABSTRACT

A compound of the formula,

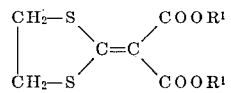

wherein $R^1$ is a lower alkyl of 3 or 4 carbon atoms or allyl useful in a fungicidal composition for agricultural and horticultural use containing said compound as an active ingredient.

5 Claims, No Drawings

OLAN-2-YLIDENEMALONATES

This is a division of application Ser. No. 112,054 filed Feb. 2, 1971, now U.S. Pat. No. 3,761,596 issued Sept. 25, 1973.

The present invention relates to fungicidal compositions for agricultural and horticultural use, containing as an active ingredient a compound represented by the general formula,

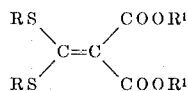

wherein R is $CH_2$ the pair of R's being joined to form the lower alkylene radical $-CH_2-CH_2-$, and $R^1$ is a lower alkyl of 3 or 4 carbon atoms or allyl.

Various fungicides are currently being used in agriculture and horticulture. However, in the case of metallic salts of dithiocarbamic acids, which are frequently used in controlling diseases of vegetables and fruit trees, their content of heavy metals such as manganese, zinc, etc., has aroused a difficult problem with respect to the residues of these metals in the crops. Moreover, these carbamates show a very feeble or almost no activity against rice blast which is one of the abominable diseases of paddy rice plants. On the other hand, in the case of fungicides containing organic phosphorus compounds, while they show an activity against rice blast, they are ineffective against other major diseases that receive attention in agriculture and horticulture.

An object of the present invention is to provide a fungicidal composition for agricultural and horticultural use, which has an excellent activity for preventing as well as curing rice blast.

Another object of the invention is to provide a fungicidal composition containing none of heavy metals.

These and other objects of the present invention will be made clear from the disclosure set forth hereunder and the appended Claims of the invention.

As a result of investigations on the fungicide, which has a wide antifungal spectrum and contains no heavy metal, the present inventors have found that the compounds represented by the above-said general formula show an excellent activity for preventing as well as curing rice blast which is one of the major diseases of the rice plant. Further, it has been found that some of these compounds are effective also against sheath blight of the paddy rice and other diseases of fruit trees and vegetables.

The compounds represented by the above-said general formula are prepared ordinarily as shown in the following scheme. The method of preparation is, of course, not limited thereto, and it is needless to say that the compounds can be prepared by the methods which are modifications or improvements of the following scheme. Reaction A:

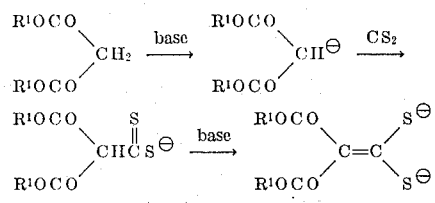

Reaction B:

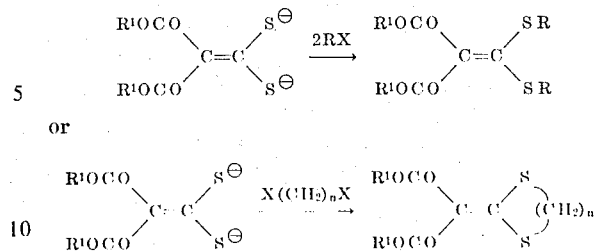

wherein R and $R^1$ signify the same as above-mentioned, $n$ is an integer of 1 to 3, and X is a halogen atom.

The compound used in the present invention as an active ingredient is synthesized by reacting in a suitable solvent a malonic ester with carbon disulfide, and then reacting the resulting dithiolate after being isolated or without being isolated with RX in which R and X signify the same as above-defined or with an alkylene dihalide. Examples of the suitable base used in reaction A include sodium hydroxide, potassium hydroxide, sodium methylate, sodium ethylate, sodium tert-amylate, metallic sodium, and sodium hydride. Examples of the suitable solvent are ethyl ether, isopropyl ether, dioxane, tetrahydrofuran, various alcohols, benzene, dimethylformamide, and dimethyl sulfoxide. The suitable ratio of the materials is 2 moles of a base and 1 mole of carbon disulfide for 1 mole of a malonic ester. Examples of the solvent for use in reaction B include those mentioned for reaction A and, in addition, acetone, water, and mixtures of water and alcohols.

Reactions A and B advantageously proceed ordinarily at temperatures of 5° to 70°C.

For synthesizing these 1,3-dithiolane derivatives, there is the following method beside those mentioned above.

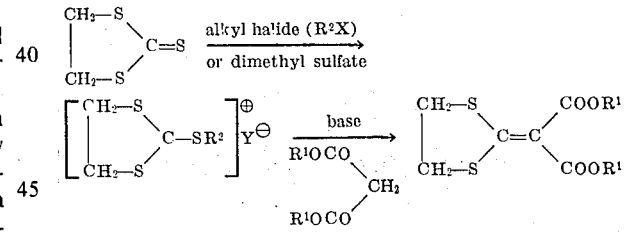

wherein $R^2$ signifies a lower alkyl group or methyl group, $R^1$ and X signify the same as above, and Y signifies a halogen atom or $-(SO_4)_{1/2}$. That is, ethylene trithiocarbonate, the starting material, is admixed with an alkyl halide or dimethyl sulfate to form a complex, and then the complex is reacted with a malonic ester to obtain the desired product. As a base, caustic soda is usually employed in this reaction.

Typical examples of the compound represented by the above-said general formula are given hereunder.

1. n-Propyl 1,3-dithiolan-2-ylidenemalonate

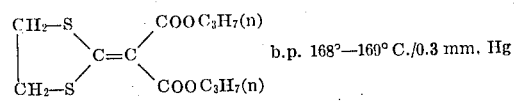

b.p. 168°—169°C./0.3 mm. Hg

2. Isopropyl 1,3-dithiolan-2-ylidenemalonate

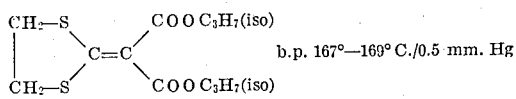

3. n-Butyl 1,3-dithiolan-2-ylidenemalonate

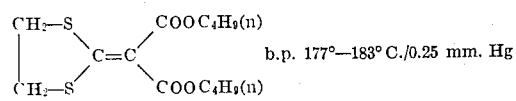

4. Allyl 1,3-dithiolan-2-ylidenemalonate

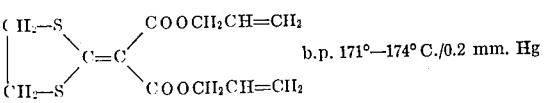

For use as the fungicide in agriculture and horticulture, the compound represented by the above-said general formula is formulated by diluting with inert diluents in a manner common to the formulation of other pesticides. The compound represented by the above-said general formula and, if desired, a suitable auxiliary agent are dissolved or dispersed in, or mixed with, or adsorbed on a suitable inert carrier to be formulated as a wettable powder, dust, granule, emulsifiable concentrate, oil, solution, paste, or preparation for seed coating. The inert carrier to be used in the present invention may be either solid or liquid. The solid carriers include vegetable powders such as soybean flour, wood flour, pulverized stalk of tobacco plant, and pulverized walnut shell, and mineral powders such as talc, clay, bentonite, diatomaceous earth, and sand. As the liquid carrier, may be used any liquid which has a solvent action or which is capable of dispersing or solubilizing the active ingredient by the assistance of auxiliary agents. These liquid carriers include, for example, alcohols such as methanol, ethanol, propanol; ketones such as acetone, methyl ethyl ketone, methyl isobutyl ketone; ethers such as ethyl ether, dioxane; aromatic hydrocarbons such as benzene, toluene, xylene, methylnaphthalene; lower fatty acid esters such as ethyl acetate; lower fatty acid amides such as dimethylformamide; halohydrocarbons such as chloroform; dimethyl sulfoxide, isophorone, etc.

As the examples of auxiliary agents, may be listed non-ionic, anionic or cationic surface active agents such as polyoxyethylene alkylaryl ethers, alkylaryl polyethylene glycol ethers, alkylaryl sulfonates, sulfuric acid esters of higher alcohols, alkyldimethylbenzylammonium halides, and alkylbenzene sulfonates; ligninsulfonates, stearates, polyvinylalcohol, CMC, gum arabic, etc. However, the auxiliary agents for use in this invention are not limited to those mentioned above.

While the proportion of the active ingredient in the formulated preparation can be varied in accordance with the requirement, the suitable amount is ordinarily in a range of 1 to 10 percent by weight in the case of a dust or granule, and 10 to 50 percent by weight in the case of an emulsifiable concentrate or wettable powder. In the case of concentrated preparations for a low or ultra-low volume application or an aerial application, the proportion is in a range of 50 to 99 percent by weight.

The present invention covers the mode of application, in which the present fungicidal composition is directly applied to exposed surfaces of the plant body to be protected, or is applied to the plant body through the paddy water or through the soil, for the purpose of either preventing or curing plant diseases. In the case where other pesticides, fertilizers, plant nutrients, or soil conditioners are to be used, the present fungicidal composition may be used in admixture with any one of them. For instance, in the case where the present fungicidal composition is to be used for controlling the rice blast, it may be used in the form of a multipurpose controlling agent by mixing with an insecticide (or a fungicide as the case may be) to control the rice plant pest which makes appearance at the same time as the outbreak of blast disease.

As examples of the typical pesticides, may be listed the following chemicals: fungicides including antibiotic substances such as "Blastcidin-S", "Kasugamycin", and "Polyoxin", and synthetic fungicides such as O,O-diisopropyl"S-benzylthiophosphate, 2,4,5-trichlorophenyl O-ethyl O-phenylphosphate; insecticides including organophosphorus insecticides such as O,O-dimethyl O-(3-methyl-4-nitrophenyl)thiophosphate, O-ethyl O-p-nitrophenyl thionobenzenephosphonate, Malathion, and carbamate insecticides such as 1-naphthyl N-methylcarbamate, m-tolyl N-methylcarbamate, etc.

Some test examples are given hereunder to illustrate the effectiveness of the present fungicidal compositions. The compound No. given in the Tables corresponds to that assigned to each compound hereinbefore.

TEST EXAMPLE 1

Test of preventive effects against rice blast (pot test)

The sample containing a given amount of test compound was applied on paddy rice seedlings (variety, "Jikkoku"; height, 20 cm) cultured in Greenhouse at the rate of 10 ml/pot on a turn table by means of a spray gun (1.5 kg/cm$^2$). After one day, the spore-suspension of rice blast (Pyricularia oryzae) was sprayed to the seedlings to inoculate and left standing in a moist chamber at 24°C for 24 hours, then in a frame covered with vinyl film in a greenhouse in order to keep them under a moist condition. Four days after the inoculation, the number of disease spots per leaf was counted to calculate the preventive value of the test compound.

Preventive value (%)
= (Number of disease spots per leaf untreated) − (Number of disease spots per leaf treated)/Number of disease spots per leaf untreated × 100

| Test Compound No. | Active ingredient concentration (ppm) | Number of disease spots per leaf | Preventive value (%) | Phytotoxicity |
| --- | --- | --- | --- | --- |
| 1 | 1,000 | 4.54 | 71.4 | — |
| 2 | 1,000 | 3.92 | 75.3 | — |
| 3 | 1,000 | 4.08 | 74.3 | — |
| 4 | 1,000 | 4.50 | 71.7 | — |
| 5 | 1,000 | 0.79 | 95.0 | — |
| 6 | 1,000 | 4.80 | 69.8 | — |
| 7 | 1,000 | 4.45 | 72.0 | — |
| 8 | 1,000 | 0.94 | 94.1 | — |
| 9 | 1,000 | 2.95 | 81.4 | — |
| 10 | 1,000 | 0.40 | 97.5 | — |
| 11 | 1,000 | 0.16 | 99.0 | — |
| 12 | 1,000 | 0.08 | 99.5 | — |
| 13 | 1,000 | 3.10 | 80.5 | — |
| 14 | 1,000 | 0.45 | 97.2 | — |
| 15 | 1,000 | 4.80 | 69.8 | — |
| 16 | 1,000 | 4.80 | 69.8 | — |
| Untreated | — | 15.89 | | |

TEST EXAMPLE 2

Test of curative effects against rice blast (pot test)

To the paddy rice seedlings (variety, "Jikkoku"; height, 20 cm) cultured in greenhouse were sprayed the spore-suspension of rice blast to inoculate with the causal fungus of blast. After one day, the seedlings were applied with the sample containing a given amount of test compound, on a turn table by means of a spray gun, and kept in a greenhouse. Four days after the application, the number of disease spots was counted to calculate the curative value of the test compound.

Curative value (%)
= (Number of disease spots per leaf untreated) − (Number of disease spots per leaf treated)/Number of disease spots per leaf untreated × 100

| Test compound No. | Active ingredient concentration (ppm) | Number of disease spots per leaf | Curative value, % |
| --- | --- | --- | --- |
| 1 | 500 | 0.46 | 97.5 |
| 2 | 500 | 0.35 | 98.1 |
| 3 | 500 | 0.92 | 95.0 |
| 4 | 500 | 3.25 | 82.3 |
| 5 | 500 | 5.98 | 67.4 |
| 6 | 500 | 2.87 | 84.4 |
| 7 | 500 | 3.93 | 78.6 |
| 8 | 500 | 5.45 | 70.3 |
| 9 | 500 | 2.30 | 87.5 |
| 10 | 500 | 0.07 | 99.6 |
| 11 | 500 | 1.82 | 90.1 |
| 12 | 500 | 2.28 | 87.6 |
| 13 | 500 | 2.15 | 88.3 |
| 14 | 500 | 5.27 | 71.3 |
| 15 | 500 | 4.01 | 78.2 |
| 16 | 500 | 4.09 | 77.7 |
| Untreated | — | 18.35 | — |

Some Examples of embodiments of the present invention are given below. It is needless to say that the scope of the invention is not limited thereto.

EXAMPLE 1

Synthesis of ethyl bis(ethylthio)methylidenemalonate

To a vigorously stirred suspension of 17.5 g (0.4 mole) of 60 percent-purity NaH in 500 ml of benzene, was added dropwise 32 g (0.2 mole) of diethyl malonate. After completion of the addition, the mixture was stirred at room temperature for 2 hours and then 15.3 (0.2 mole) of carbon disulfide was added thereto. The mixture was allowed to react with stirring at room temperature for 48 hours to obtain a suspension of disodium diethoxycarbonylketenemercaptal in benzene. To the suspension was added 43.6 g (0.4 mole) of ethyl bromide, and the mixture was stirred at room temperature for one hour, then on a water bath for one hour under reflux. After cooling, water was added thereto to separate a benzene layer which was washed with dilute hydrochloric acid, then with water. After removing the benzene by distillation, the reaction product was distilled under reduced pressure to obtain 39.6 g of ethyl bis(ethylthio)-methylidenemalonate boiling at 128° − 134°C/0.5 mmHg in a yield of 68 percent.

EXAMPLE 2

Synthesis of isopropyl 1,3-dithiolan-2-ylidenemalonate (Compound No. 2)

Disodium diisopropoxycarbonylketene mercaptal was prepared from 38 g (0.2 mole) of diisopropyl malonate in the same manner as described in Example 1. The mercaptal was reacted with 40 g (0.2 mole) of dibromoethane by heating under reflux for 4 hours to obtain 14 g of the expected product boiling at 167° − 169°C/0.5 mmHg in a yield of 24 percent.

EXAMPLE 3

Emulsifiable concentrate

An emulsifiable concentrate prepared by homogeneously mixing the following ingredients to form a solution.

| | |
| --- | --- |
| Isopropyl 1,3-dithiolan-2-yliolenemalanate | 40 Parts |
| Tetrahydrofuran | 20 |
| Xylene | 25 |
| A mixture of polyoxyethylene nonylphenyl ether and an alkylbenzenesulfonate | 15 |

EXAMPLE 4

Dust preparation

A dust preparation produced by homogeneously mixing and grinding the following ingredients.

| | |
| --- | --- |
| Isopropyl 1,3-dithiolan-2-yliolenemalonate | 4 Parts |
| A mixture of diatomaceous earth, clay, and talc. | 95 |
| Calcium stearate | 1 |

EXAMPLE 5

Emulsifiable concentrate

An emulsifiable concentrate prepared by homogeneously mixing the following ingredients to form a solution.

| | |
| --- | --- |
| Isopropyl 1,3-dithiolan-2-ylidenemalonate | 20 Parts |
| 2,4,5-Trichlorophenyl O-ethyl-O-phenylphosphate (a typical example of organophosphorus fungicides) | 20 Parts |
| Tetrahydrofuran | 20 |
| Xylene | 25 |
| A mixture of polyoxyethylene nonylphenyl ether and an alkylbenzenesulfonate | 15 |

What is claimed is:

1. A compound of the formula $$\begin{array}{c} CH_2-S \\ | \\ CH_2-S \end{array} C=C \begin{array}{c} COOR^1 \\ \\ COOR^1 \end{array}$$

wherein $R^1$ is a lower alkyl of 3 or 4 carbon atoms or allyl.

2. A compound in accordance with claim 1 wherein $R^1$ is allyl.

3. A compound in accordance with claim 1 wherein $R^1$ is isopropyl.

4. A compound in accordance with claim 1 wherein $R^1$ is n-propyl.

5. A compound in accordance with claim 1 wherein $R^1$ is n-butyl.

* * * * *

UNITED STATES PATENT OFFICE
CERTIFICATE OF CORRECTION

Patent No. 3,856,814      Dated December 24, 1974

Inventor(s) Kuniaki TANINAKA, Osamu SHIOYAMA and Kikuzo MURATA

It is certified that error appears in the above-identified patent and that said Letters Patent are hereby corrected as shown below:

The title of the invention is 1,3-DITHIOLAN-2-YLIDENEMALONATES

Signed and Sealed this ninth Day of September 1975

[SEAL]

Attest:

RUTH C. MASON
*Attesting Officer*

C. MARSHALL DANN
*Commissioner of Patents and Trademarks*